(12) United States Patent  (10) Patent No.: US 8,538,927 B2
Cisler et al.  (45) Date of Patent: *Sep. 17, 2013

(54) USER INTERFACE FOR BACKUP MANAGEMENT

(75) Inventors: Pavel Cisler, Los Gatos, CA (US); Mike Matas, San Francisco, CA (US); Gregory N. Christie, San Jose, CA (US); Marcel van Os, San Francisco, CA (US); Kevin Tiene, Cupertino, CA (US); Gene Zyrl Ragan, Santa Clara, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,153

(22) Filed: Dec. 14, 2010

(65) Prior Publication Data

US 2011/0083098 A1   Apr. 7, 2011

Related U.S. Application Data

(63) Continuation of application No. 11/499,881, filed on Aug. 4, 2006, now Pat. No. 7,856,424.

(51) Int. Cl.
 *G06F 17/30* (2006.01)
(52) U.S. Cl.
 USPC .......................... 707/654; 715/784
(58) Field of Classification Search
 USPC ................... 707/654; 715/229, 784
 See application file for complete search history.

(56) References Cited

U.S. PATENT DOCUMENTS

| 5,150,473 | A | 9/1992 | Zulch |
| 5,163,148 | A | 11/1992 | Walls |
| 5,276,867 | A | 1/1994 | Kenley et al. |
| 5,369,570 | A | 11/1994 | Parad |
| 5,680,562 | A | 10/1997 | Conrad et al. |

(Continued)

FOREIGN PATENT DOCUMENTS

| EP | 0629950 | 12/1994 |
| EP | 1152352 | 11/2001 |

(Continued)

OTHER PUBLICATIONS

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

(Continued)

*Primary Examiner* — Amresh Singh
(74) *Attorney, Agent, or Firm* — Kilpatrick Townsend & Stockton LLP

(57) ABSTRACT

Systems and methods for providing a user interface including earlier versions of data. In one implementation, computer program product is provided. The computer program product generates a user interface. The user interface includes a view display area for presenting a current view and a history view display area for presenting a history view associated with the current view. The history view includes one or more first visual representations of corresponding earlier versions of the current view. The user interface also includes an input control for initiating a restoration of the current view according to at least a portion of an earlier version of the one or more earlier versions.

30 Claims, 12 Drawing Sheets

(56) References Cited

U.S. PATENT DOCUMENTS

| | | | |
|---|---|---|---|
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,167,532 A | 12/2000 | Wisecup |
| 6,188,405 B1 | 2/2001 | Czerwinski et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,711,572 B2 | 3/2004 | Zakharov et al. |
| 6,714,201 B1 | 3/2004 | Grinstein et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 | 8/2004 | Connor |
| 6,785,786 B1 | 8/2004 | Gold et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,948,039 B2 | 9/2005 | Biessener et al. |
| 6,959,368 B1 | 10/2005 | St. Pierre et al. |
| 7,072,916 B1 | 7/2006 | Lewis et al. |
| 7,103,740 B1 | 9/2006 | Colgrove et al. |
| 7,111,136 B2 | 9/2006 | Yamagami |
| 7,133,902 B2 | 11/2006 | Saha et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,318,134 B1 | 1/2008 | Oliveira et al. |
| 7,386,801 B1 | 6/2008 | Horvitz et al. |
| 7,418,619 B1 | 8/2008 | Uhlmann et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,518,611 B2 | 4/2009 | Boyd et al. |
| 7,558,930 B2 | 7/2009 | Kitamura et al. |
| 7,590,668 B2 | 9/2009 | Kathuria et al. |
| 7,630,021 B2 | 12/2009 | Matsuzaka et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,711,771 B2 | 5/2010 | Kirnos |
| 7,860,839 B2 | 12/2010 | Cisler et al. |
| 2001/0047368 A1 | 11/2001 | Oshinsky et al. |
| 2002/0023198 A1 | 2/2002 | Kokubun et al. |
| 2002/0046220 A1 * | 4/2002 | Freeman et al. ........... 707/501.1 |
| 2002/0054158 A1 | 5/2002 | Asami |
| 2002/0063737 A1 | 5/2002 | Feig et al. |
| 2002/0080180 A1 | 6/2002 | Mander et al. |
| 2002/0160760 A1 | 10/2002 | Aoyama |
| 2002/0174283 A1 | 11/2002 | Lin |
| 2003/0016248 A1 | 1/2003 | Hayes Ubillos |
| 2003/0018878 A1 | 1/2003 | Dorward et al. |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0195903 A1 | 10/2003 | Manley et al. |
| 2003/0220949 A1 | 11/2003 | Witt et al. |
| 2004/0066414 A1 | 4/2004 | Czerwinski et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 | 8/2004 | Oshinsky et al. |
| 2004/0193953 A1 | 9/2004 | Callahan et al. |
| 2004/0199826 A1 | 10/2004 | Bertram et al. |
| 2004/0210608 A1 | 10/2004 | Lee et al. |
| 2004/0220980 A1 | 11/2004 | Forster |
| 2004/0228493 A1 | 11/2004 | Ma |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0041823 A1 | 2/2006 | Wolfgang et al. |
| 2006/0053332 A1 | 3/2006 | Uhlmann |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0101384 A1 | 5/2006 | Sim-Tang et al. |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0156246 A1 | 7/2006 | Williams et al. |
| 2006/0161861 A1 | 7/2006 | Holecek et al. |
| 2006/0218363 A1 | 9/2006 | Palapudi |
| 2006/0248294 A1 | 11/2006 | Nedved et al. |
| 2006/0253470 A1 | 11/2006 | Friedman et al. |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043790 A1 | 2/2007 | Kryger |
| 2007/0070066 A1 * | 3/2007 | Bakhash ........................ 345/419 |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0185879 A1 | 8/2007 | Roublev et al. |
| 2007/0185922 A1 | 8/2007 | Kapoor et al. |

| | | | |
|---|---|---|---|
| 2007/0192386 A1 | 8/2007 | Fries et al. | |
| 2007/0266007 A1 | 11/2007 | Arrouye et al. | |
| 2007/0271263 A1 | 11/2007 | Merrild | |
| 2007/0271303 A1 | 11/2007 | Menendez et al. | |
| 2007/0288536 A1 | 12/2007 | Sen et al. | |
| 2008/0016576 A1 | 1/2008 | Ueda et al. | |
| 2008/0022393 A1 | 1/2008 | Waltermann et al. | |
| 2008/0028007 A1 | 1/2008 | Ishii et al. | |
| 2008/0033922 A1 | 2/2008 | Cisler et al. | |
| 2008/0033969 A1 | 2/2008 | Koo et al. | |
| 2008/0034004 A1 | 2/2008 | Cisler et al. | |
| 2008/0034011 A1 | 2/2008 | Cisler et al. | |
| 2008/0034013 A1 | 2/2008 | Cisler et al. | |
| 2008/0034017 A1 | 2/2008 | Giampaolo et al. | |
| 2008/0034018 A1 | 2/2008 | Cisler et al. | |
| 2008/0034019 A1 | 2/2008 | Cisler et al. | |
| 2008/0034039 A1 | 2/2008 | Cisler et al. | |
| 2008/0059894 A1 | 3/2008 | Cisler et al. | |
| 2008/0065663 A1 | 3/2008 | Farlee et al. | |
| 2008/0077808 A1 | 3/2008 | Teicher et al. | |
| 2008/0082578 A1 | 4/2008 | Hogue et al. | |
| 2008/0091655 A1 | 4/2008 | Gokhale et al. | |
| 2008/0126441 A1 | 5/2008 | Giampaolo et al. | |
| 2008/0126442 A1 | 5/2008 | Cisler et al. | |
| 2008/0141029 A1 | 6/2008 | Culver | |
| 2008/0177961 A1 | 7/2008 | McSharry et al. | |
| 2008/0208630 A1 | 8/2008 | Fors et al. | |
| 2008/0216011 A1 | 9/2008 | Gould | |
| 2008/0229037 A1 | 9/2008 | Bunte et al. | |
| 2008/0250342 A1 | 10/2008 | Clark et al. | |
| 2008/0285754 A1 | 11/2008 | Kezmann | |
| 2008/0307000 A1 | 12/2008 | Paterson et al. | |
| 2010/0017855 A1 | 1/2010 | Johnson et al. | |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2008/019237 | 2/2008 |

OTHER PUBLICATIONS

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

Bonwick, "ZFS the Last Word in File Systems," [Online] [Retrieved on Jan. 22, 2008] Retrieved from the Internet: URL:http://opensolaris.org/os/community/zfs/docs/zfs.pdf, 34 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

Rubel, "Easy Automated Snapshot-Style Backups with Rsync," [Online][Retrieved on Nov. 8, 2010] Retrieved from the Internet URL: http://www.mikerubel.org/computers/rsync_snapshots; 18 pages.

"StorageSync: Backup, Restore, & Synchronization Software User's Guide", SimpleTech, 2003, 100 pages.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf,, 55 pages.

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

"What's New in Word 2002," Wellesly College Information Services Computing Documentation, Jan. 2002, [Online] [Retrieved on Aug. 14, 2008] Retrieved from the Internet URL: http://www.wellesley.edu/Computing/Office02/Word02/word02.html, 19 pages.

International Search Report and Written Opinion, PCT/US2007/074729, Jul. 12, 2007, 11 pages.

International Search Report and Written Opinion, PCT/US2007/074881, Jul. 12, 2007, 11 pages.

International Search Report and Written Opinion, PCT/US2007/074653, Aug. 14, 2008, 14 pages.

International Search Report and Written Opinion, PCT/US2008/065146, Oct. 31, 2008, 21 pages.

International Search Report and Written Opinion, PCT/US2008/066212, Mar. 9, 2009, 26 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Microsoft-TechNet, "Using Encrypting File System," Nov. 3, 2005, Microsoft, 40 pages.

Extended International Search Report and Written Opinion, EP 11171738.5, Aug. 29, 2011, 5 pages.

Examination Report from European Application No. 07 813 605.8 dated Oct. 27, 2011, 5 pages.

Examination Report from European Application No. 07 813 540.7 dated Oct. 27, 2011, 5 pages.

Extended European Search Report, European Application No. 11184579.8, Nov. 17, 2011, 6 pages.

Office Action dated Feb. 29, 2012 from related Chinese Application No. 200880024710.0, 11 pages.

\* cited by examiner

USER INTERFACE FOR BACKUP MANAGEMENT

RELATED APPLICATIONS

This application is a continuation application of and claims priority to U.S. application Ser. No. 11/499,881, filed on Aug. 4, 2006.

This application is generally related to the following jointly owned and co-pending patent applications, each incorporated herein by reference in its entirety:

U.S. patent application Ser. No. 11/499,839, for "Managing Backup of Content," filed Aug. 4, 2006;
U.S. patent application Ser. No. 11/499,250, for "Application-Based Backup-Restore of Electronic Information," filed Aug. 4, 2006;
U.S. patent application Ser. No. 11/499,879, for "Navigation of Electronic Backups," filed Aug. 4, 2006;
U.S. patent application Ser. No. 11/499,880, for "Architecture for Back Up and/or Recovery of Electronic Data," filed Aug. 4, 2006;
U.S. patent application Ser. No. 11/499,385, for "Searching a Backup Archive," filed Aug. 4, 2006;
U.S. patent application Ser. No. 11/499,885, for "Conflict Resolution in Recovery of Electronic Data," filed Aug. 4, 2006;
U.S. patent application Ser. No. 11/499,840, for "System for Multi-Device Electronic Backup," filed Aug. 4, 2006;
U.S. patent application Ser. No. 11/499,848, for "System for Electronic Backup," filed Aug. 4, 2006;
U.S. patent application Ser. No. 11/499,867, for "Restoring Electronic Information," filed Aug. 4, 2006;
U.S. patent application Ser. No. 11/499,386, for "Links to a Common Item in a Data Structure," filed Aug. 4, 2006;
U.S. patent application Ser. No. 11/499,866, for "Event Notification Management," filed Aug. 4, 2006;
U.S. patent application Ser. No. 11/499,256, for "Consistent Back Up of Electronic Information," filed Aug. 4, 2006.

BACKGROUND

The disclosed implementations relate generally to storing and restoring data.

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods for providing a user interface including earlier versions of data. In particular, a user interface having a current view and a history view including a number of visual representations of earlier views (e.g., snapshots), the earlier views can represent earlier states of data such as files, folders, application data, preferences, and other system data. The user can navigate between earlier views as well as within the earlier views. Navigation and actions can be animated.

In general, in one aspect, a computer program product is provided. The computer program product generates a user interface. The user interface includes a view display area for presenting a current view and a history view display area for presenting a history view associated with the current view. The history view includes one or more first visual representations of corresponding earlier versions of the current view. The user interface also includes an input control for initiating a restoration of the current view according to at least a portion of an earlier version of the one or more earlier versions.

Implementations can include one or more of the following features. Each earlier version can include at least a first element that a user can select, and wherein initiation of the input control after the selection initiates the restoration of the current view according to only the first element of the earlier version. The history view display area can further include a user-activated information area that presents information about a selected earlier version. The information area provides data associated with the selected earlier version including when the earlier version was created or a location of the data of the earlier version.

The first visual representation can be included in a timeline presented in the history view, the timeline including several visual representations of earlier versions of the current view. The history view can include one or more navigation tools for navigating between the visual representations of the earlier versions in the timeline. The navigation tools can include one or more scroll bars for scrolling through visual representation of the earlier versions, including scrolling to additional visual representations of earlier versions not initially shown in the history view. The navigation tools can include one or more arrow buttons for scrolling to additional visual representations of earlier versions not initially shown in the history view. The earlier versions in the timeline can be presented with a corresponding date range associated with the earlier version. The date range can be a single date.

The history view can further include another input control for modifying the timeline to include only at least one of the visual representations whose corresponding earlier version differs from the current view. The history view can present the visual representations of the earlier versions as a stack. The history view can include one or more navigation tools for navigating the stack of visual representations. The history view can animate the navigation between visual representations in the stack of visual representations.

The history view can display the visual representations as a calendar, the calendar showing the visual representations with respect to the corresponding date in which the earlier version was generated. The history view can receive a user input to display the visual representations in a different format. Displaying the visual representations in a different format can include providing a menu for user selection of a particular format. The history view can further include a preview area that presents at least the first element of the earlier version. The preview area can present a representation of the first element without invoking an application associated with the first element.

The history view display area can further include a user-activated item timeline area that presents information about the earlier versions. The presented information can include information associated with changes to the first element in one or more of the earlier versions. The information associated with changes to the first element can identify each earlier version where a change occurred and the type of change that occurred. The computer program product can further include animating the history view during display of the visual representations of the earlier versions.

In general, in one aspect, a method relating to modifying a view in a user interface is provided. The method includes receiving, while a current view is displayed in a user interface, a first user input requesting that a history view associated with the current view be displayed. The history view is displayed in response to the first user input, the history view including at least a first visual representation of an earlier version of the current view, the earlier version including a first element. The history view display including a view display area for presenting a current view, and a history view display area for presenting a history view associated with the current view, the history view including one or more first visual representations of corresponding earlier versions of the current view. A second user input is received while the history view is displayed requesting that the current view be modified according to the earlier version, at least with regard to the first element. The current view is modified in response to the second user input according to the earlier version, at least with regard to the first element.

In general, in one aspect, a method is provided. The method includes defining criteria for capturing a state of a view of a user interface. The state of the view is captured in accordance with the criteria. A prompt is received to suspend presentation of a current view and present a captured view. The captured view is presented in a history view interface. The history view interface includes a view display area for presenting a current view, and a history view display area for presenting a history view associated with the current view, the history view including one or more first visual representations of corresponding capture views of the current view. The captured view is reinstated into the current view of the user interface.

Particular embodiments of the subject matter described in this specification can be implemented to realize one or more of the following advantages. Backup data can be stored, allowing a user to retrieve past states of applications or data. The user can easily navigate a set of visual representations of the earlier views. The user interface provides an intuitive navigation and restore environment for finding and restoring earlier versions of data.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
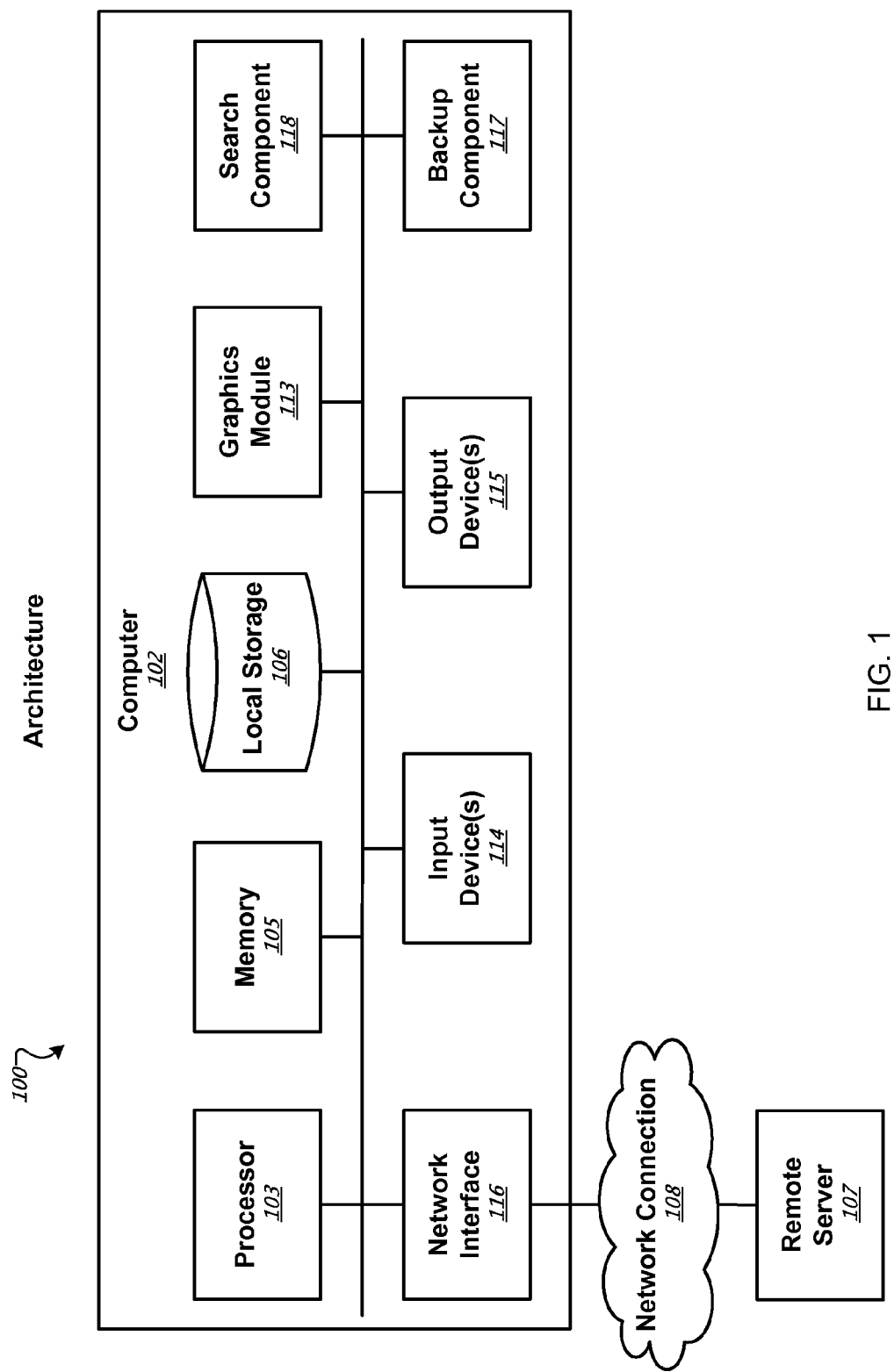
FIG. 1 is a block diagram of an example of an architecture for backing up, searching, or restoring system information.

FIG. 1 is a block diagram of an architecture 100 that allows a user to search a captured version of an interface view, perhaps to initiate a restoration based on it. As used herein, a view refers to an item, element, or other content, capable of being stored and/or retrieved in an interface, that can be subjected to a backup operation by a backup component 117. For example, a user interface view can contain any number of icons, files, folders, application state information and/or machine state information, preferences, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for searching stored contents that correspond to earlier versions of system information, application information or system, application, or user interface state. The systems and methods can be stand-alone or otherwise integrated into a more comprehensive application. In the materials presented below, integrated systems and methods are provided for viewing and modifying an interface view (e.g., a user interface view) are disclosed.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application, or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items (e.g., restoring a view including past state of a file, application, application data, parameters, settings, and the like), for example within the local storage 106 or in an external storage repository. In one implementation, the backup component 117 also allows a user to select any of the stored versions and use it to initiate a restoration of that version in the computer 102.

The computer 102 includes a search component 118 that allows for searches of the computer's files or other items, for example within the local storage 106 or an external storage repository. In one implementation, the search component 118 can interact with the backup component 117 to perform searches of stored versions of the computer's files and other items. Particularly, in one implementation, the search component 118 provides that a user can select search results that have been identified in an earlier version and use them to initiate a restoration of that version in the computer 102. This means that when a user searches for a file but the file is not found, the user can invoke the backup component 117 (or a portion thereof) to show one or more previous states of the C: drive or some other system resource. In other words, the user is looking at the content of the C: drive (that does not currently hold the sought file), and launches the backup component to look at previous states to see if the file has been archived. This operation can be facilitated by the search environment forwarding information (e.g., an identity of the sought file) to the backup environment for showing the correct archive(s).

Figure 2:
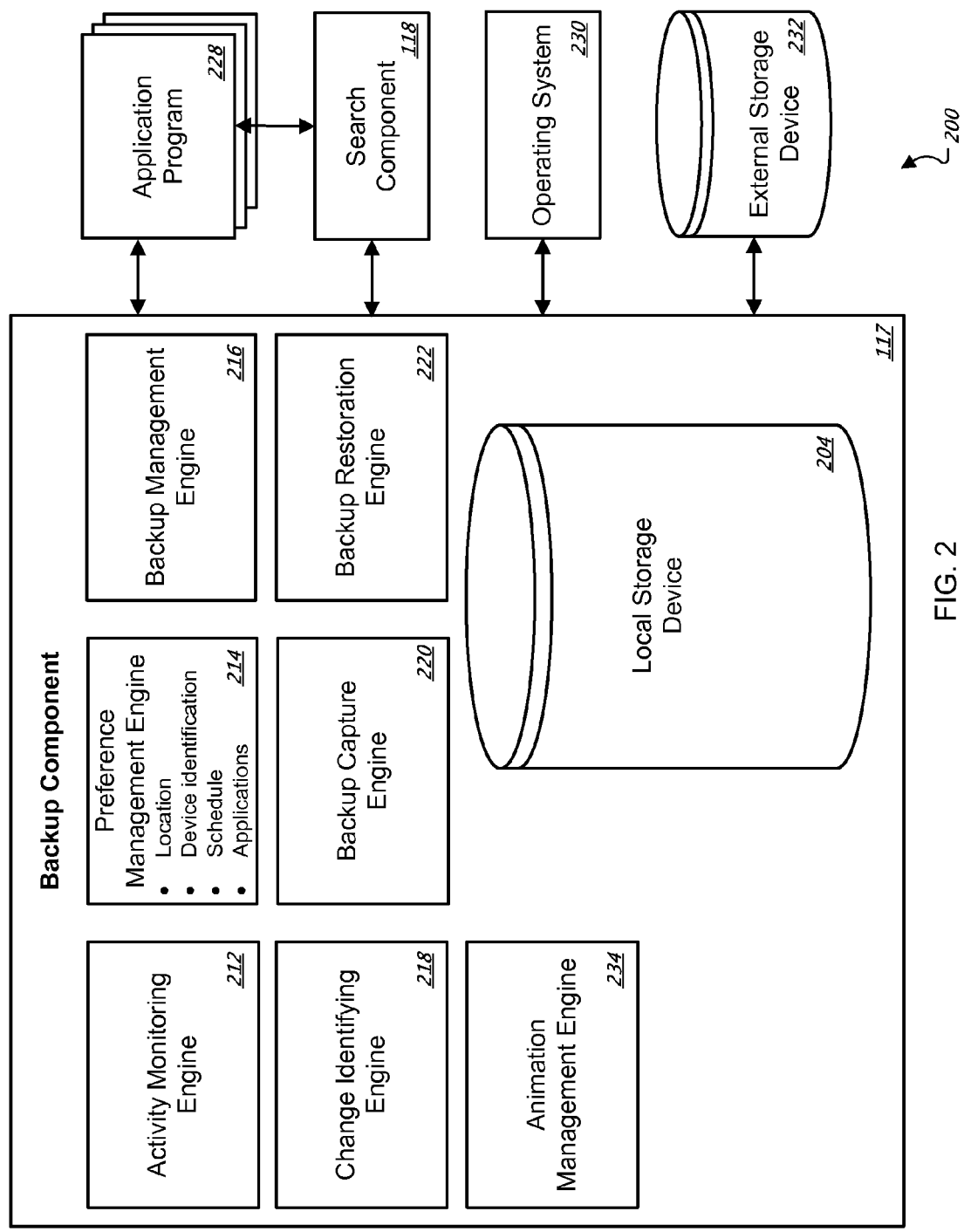
FIG. 2 is a block diagram of an example of interactions with a backup component for backing up, searching, or restoring system information.

FIG. 2 is a block diagram of an exemplary architecture 200 for the back up and restoration of data (e.g., application files, application data, settings, parameters or the like), such as those associated with a set of application programs 228. Backup component 117 provides back up and restoration capability for the system. Many different items or elements can be the subject of a backup operation in the system. For example, folders, files, items, information portions, directories, images, system parameters, playlists, address books, e-mails, e-mail folders, a state of an application or state of the system, preferences (e.g., user or system preferences), and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In one implementation, no local storage is provided.

In one implementation, the backup component 117 runs as a background task on an operating system 230 such that it is not visible to the user. The backup component 117 can be capable of running across multiple user accounts. In another implementation, the backup component 117 runs within an application in the user space.

The backup component 117 includes an activity monitoring engine 212. In one implementation, the activity monitoring engine 212 monitors for changes within an application view (e.g., application files or state) that are targeted for a backup operation. A change can also include the addition of new files or data (e.g., files or other data structures) or deletion of the same. In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements (e.g., files) to be used when a backup event is eventually triggered. In one implementation, the activity monitoring engine 212 can monitor the system for periods of inactivity. The activity monitoring engine 212 can then trigger a backup event during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of the backup capture, the storage location for the backup versions, the types of elements (e.g. files or other items) that are eligible for backup capture, and the events which trigger a backup capture (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on lettered drives such as C: drive and within D:/photos, or named drives such as "MyBigDisk" drive or within named directories such as within "/ExtraStorage/Photos", thus reference in this specification to drives is not limited to lettered drives or paths), a correlation with specific applications (e.g. all pictures, music, e-mail in an inbox, an address book and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214.

A change identifying engine 218 locates specific elements (e.g., monitored files or other items within) the system 200 to determine if they have changed. The change identifying engine 218 can be capable of discerning a substantive change from a non-substantive change, similar to the example described above for the activity monitoring engine 212. In one implementation, the change identifying engine 218 traverses a target set of elements (e.g., files, data, or other items), comparing a previous version to the current version to determine whether or not a modification has occurred.

A backup capture engine 220 locates views (e.g., elements, files, data, or other items) that are to be included in a backup. The backup capture engine 220 can invoke the activity monitoring engine 212 and/or the change identifying engine 218, for example, to generate a capture data/item list. The backup capture engine 220 can then store copies of these elements in one or more targeted storage repositories. The backup capture engine 220 can track multiple version copies of each item included in the backup repository.

The backup component 117 includes a backup restoration engine 222 to restore previous versions of views (e.g., files, data, or other items). In one implementation, the backup restoration engine 222 provides a user interface (e.g., a graphical user interface) where a user can select the item(s) to be restored.

The backup component 117 includes an animation management engine 234. The animation management engine 234 performs or otherwise manages animations occurring within a user interface generated by the backup component 117. For example, the animation management engine 234 can animate a timeline of captured earlier versions stored by the backup component 117. Such animation can give an overview of the archive material that is available and can help a user choosing a particular backup version to restore.

The search component 118 can search directly within the one or more application programs 228 for a current state or version of the files or other items. In addition, the search component 118 can search earlier versions of the files and other items using the backup component 117. For example, the search component 118 can provide a search interface within a time machine user interface that allows searches of earlier versions of the files or other items. In addition, the search component 118 can provide a search interface within a user interface that allows searches of the current version of the files or other items.

For example, the search component 118 be used to initiate a search to find a particular item or element, such as an image file. If this search finds the sought item, and if the item so found meets the user's expectations, there may be no need to do any further searching at the moment. However, if the search does not find the sought item, or if the item that is found does not meet the user's expectations, the user can choose to perform a search of historical views. The user can activate the time machine user interface to search the historical views.

Figure 3:
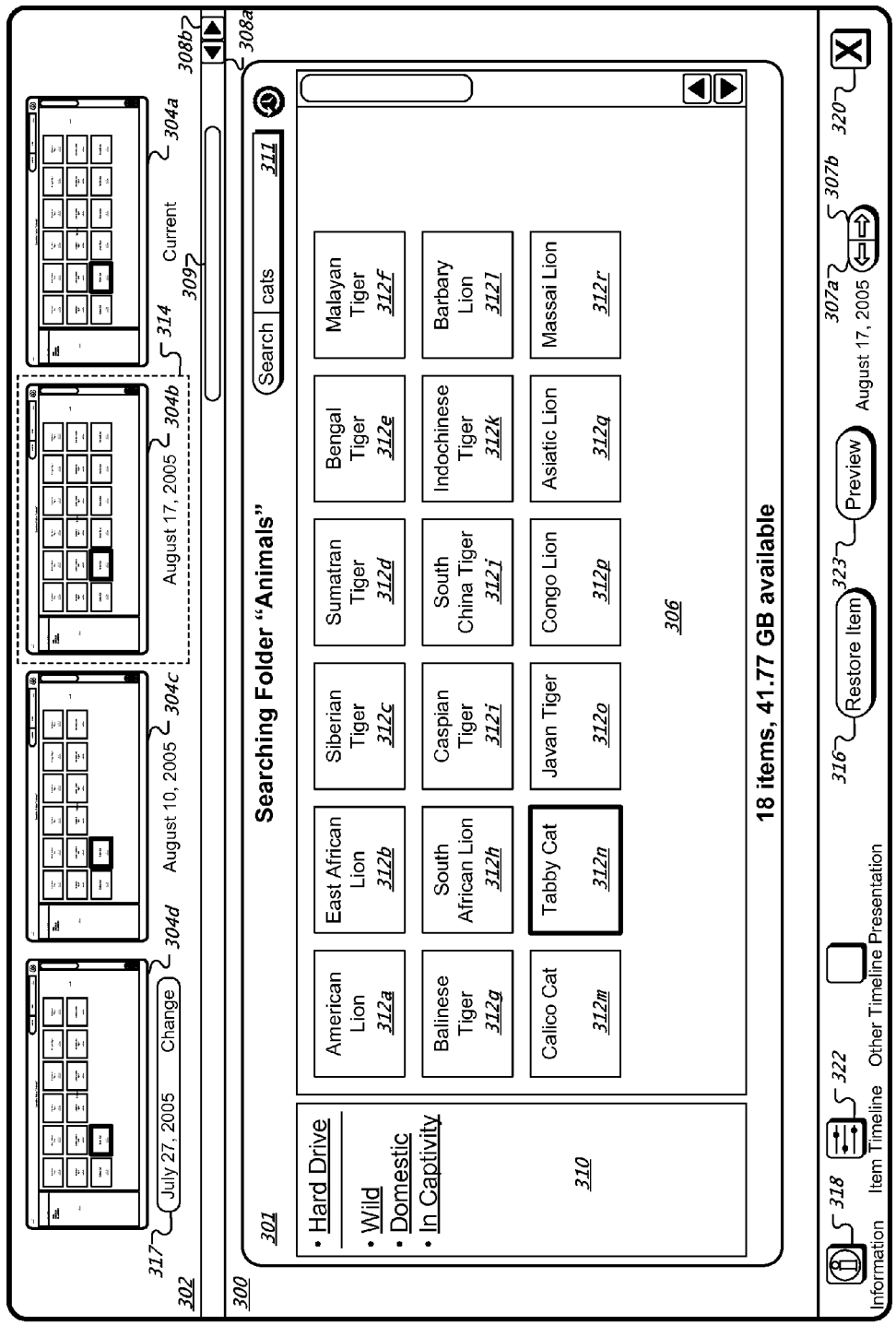
FIG. 3 is a screen shot depicting an example of a time machine user interface including search results within a search application.

FIG. 3 is a screen shot depicting an example of a time machine user interface 300 including search results within a search application 301. In certain implementations, the search component 118 generates the search application 301. The time machine user interface 300 can be a conventional user interface as can be provided by an operating system. The time machine user interface 300 has a background, a timeline 302, snapshots 304a-d, and can include windows, icons, and other elements. As used herein, a snapshot refers to a backup element stored in an archive that includes a backup of selected items or content as specified by the backup component 117. The time machine user interface 300 can have multiple applications running, any or all of which can be presented in a separate window. In other implementations, the time machine user interface presents previous versions of data other than in a search application. For example, the time machine user interface can present previous versions of a file system, particular application states, preferences, settings, etc.

The search application 301 allows a user to select one or more search controls and search parameters that specify a search for files or items to be presented in a search results area 306. A user can select a particular location, for example within the local storage device 204 or the external storage device 232, where the search will be performed, such as a server, the computer 102, a home folder, or another location. Here, a user has selected an "Animals" folder location, as indicated at the top of the search application 301. In addition, a navigation area 310 allows a user to navigate to a location within the selected search location. A search phrase control 311 allows a user to input a search phrase to be included in the search. For example, the search application 301 can identify any titles, content, or metadata that contains the search phrase "cats."

In addition to the search application 301, the time machine interface 300 here includes the timeline 302 and function buttons. The timeline 302 includes snapshots representing the results of performing the current search on an earlier version of system contents that have been backed up. In this particular example, the timeline 302 presents a date beneath the snapshots 304a-d indicating the date of the contents on which that search was performed. In certain implementations, the snapshots 304a-d shown in the timeline 302 represent only versions where some change has been made in the items since they were last backed up, such as a modification to a file or a system setting. In other implementations, the date does not necessarily refer to a single day, but can include a range of days. Alternatively, the date can represent less than a day, such as a particular hour at which the snapshot was taken.

The timeline 302 can include a number of snapshots representing searches performed on earlier versions or states of the files or items that have been backed up. Each snapshot provides a screenshot representation of the earlier version of the files or items at a particular point in time that are responsive to the search. In some implementations, the timeline 302 includes a visual representation of the search results screen, such as a miniature version thereof. The timeline 302 can appear across the top portion of the time machine interface 300 (as shown). Alternatively, the timeline 302 may not appear in the top portion of the time machine interface 300 until a user moves their cursor to (or otherwise activates) the top portion of the interface.

The time machine user interface 300 can also include function controls. For example, the interface 300 can include arrow buttons 307a and 307b to navigate forward or backward in the snapshots; currently Aug. 17, 2005 is selected. Arrow buttons 308a and 308b operate a scroll bar 309 that allows the user to navigate to additional snapshots not shown in the current timeline window, thus there can be a large number of snapshots from which to select.

Here, the search application 301 also includes a search phrase of "cats" in the search phrase control 311. The navigation area 310 shows sub-folders of the selected "Animals" folder. The search application 301 can present search results in the search results area 306 for a search performed using a currently selected snapshot. Here, the search results area 306 presents a list of items 312a-r satisfying the search conditions (i.e., being in the folder "Animals" and including the phrase "cats"). These results are represented by a currently selected snapshot 304b, as indicated by dashed line 314. The timeline 302 indicates that these results were obtained from searching an archived version of contents dated Aug. 17, 2005. Each of the items 312a-r can be represented by an identifier, such as a name or an icon, and/or can include a representation of the contents of the item, such as a thumbnail picture. A user can change the search by adding, removing, or modifying search controls.

In one example, a user can search for a file in a particular drive of a computer. Upon the search not locating the file, the user can initiate the time machine engine to view the contents of the drive at various times in the past. After selecting a particular snapshot representing the state of the drive at some point in the past, the results of the search are updated based on the selected snapshot. For example, the results now indicate whether the sought file is in the selected snapshot. If it is there, the user can restore the file from the snapshot search results.

In another example, a user can desire to restore system preference information, such as Internet security settings (e.g., the user has discovered that the current security conditions are inadequate and wishes to return to a safer security configuration). The user searches for the security setting and then activates the time machine. Previous security settings can be presented in the search results as the user selects snapshots representing backed up information for earlier settings. The user can select one or more desired security settings in a particular search result and restore them to the current security settings.

In another example, a user can restore a playlist in a music file management program, such as the iTunes application available from Apple Computer, Inc. of Cupertino, Calif. The user opens the iTunes application and performs a search for a particular playlist. Upon the search results being presented, the user can determine that the current playlist identified in the search contains songs that are too modern for his or her tastes. The user can activate the time machine and view the results of performing this search on the backed up contents ranging from the current and to a point of time in the past, say within the last few years. After receiving the search results from the earlier playlist versions, the user can select one of the playlists from the past and restore it to the present state of iTunes.

A restore button 316, when selected, restores the current system state with the files or items in the presented search results. In some implementations, this terminates the session of the time machine 300. A user can select one or more items in the search results and then select the restore button 316 to modify the current version of the item or items selected, if such a version exists, or otherwise to restore the file or item to the current state. For example, the user can select the Tabby Cat item 312n, thereby triggering the restore button to display a more precise message, such as "restore item." Restoration of the items involves the retrieval of the item from the archive, and instantiation in the current environment. For example, a file can be retrieved from an archive folder and placed in its current folder, where it is accessible to a user; a system preference (e.g., a time zone or language setting) can be retrieved from an archive and restored as a current system preference that affects the system operation in some regard; or an address book can be restored such that contacts existing in the archived address book are returned to a current address book.

Selecting the Tabby Cat item 312n can trigger corresponding selections of that respective file in others of the presented snapshots 304a-d. As another example, selection of the Tabby Cat item 312n can, in certain implementations, result in the timeline 302 highlighting those snapshots where the Tabby Cat item 312n differs from the selected snapshot 304b. Here, the snapshot 304d is highlighted as indicated by a highlighting border 317 and the text "Change."

An information button 318 provides information regarding the selected snapshot. In one implementation, selecting the information button 318 opens a panel display. The panel display provides, in one implementation, information including the date and time the snapshot was made, the location of actual contents in a snapshot, the size of the snapshot, and a comment section.

A close button 320 can be selected to exit the time machine engine 300 and return the user to a desktop. In some implementations, the time machine engine 300 can automatically close upon restoring a particular snapshot. In other implementations, the time machine engine 300 can be minimized for purposes of navigating to other applications, such as an email application or a web browser.

In one implementation, the time machine user interface 300 includes a preview button 323. The preview button, when selected, presents a preview of a selected item or element of a snapshot. For example, if a user selecting an image item in the folder such as Tabby Cat 312, selects the preview button 323, an image preview can be presented to the user within the time machine user interface 300. The user can use the preview function to verify that the item is the item (or the version of the item) that the user wants to restore. In one implementation, the item can be a document. The preview function button allows the user to view the document without invoking the underlying application (e.g., a work processing application). In one implementation, the preview can change as the user selects different versions of the item. For example, a user can preview a particular slide (e.g., slide 8) of an item that includes a slide presentation. The user can then select different versions of the presentation from the timeline. The preview changes with each selected earlier version to show the version of the same slide in the presentation (e.g., displays slide 8 for each selected version of the presentation).

In some implementations, the user can select an item timeline icon 322 to open a timeline view of snapshots, which can present information about one or more snapshots and optionally facilitate navigation to any snapshot. In some implementations, the timeline view can be toggled off and on using the item timeline icon 322. Here, the user initiates the timeline view using the timeline icon 322 and the information view using the information button 318.

Figure 4:
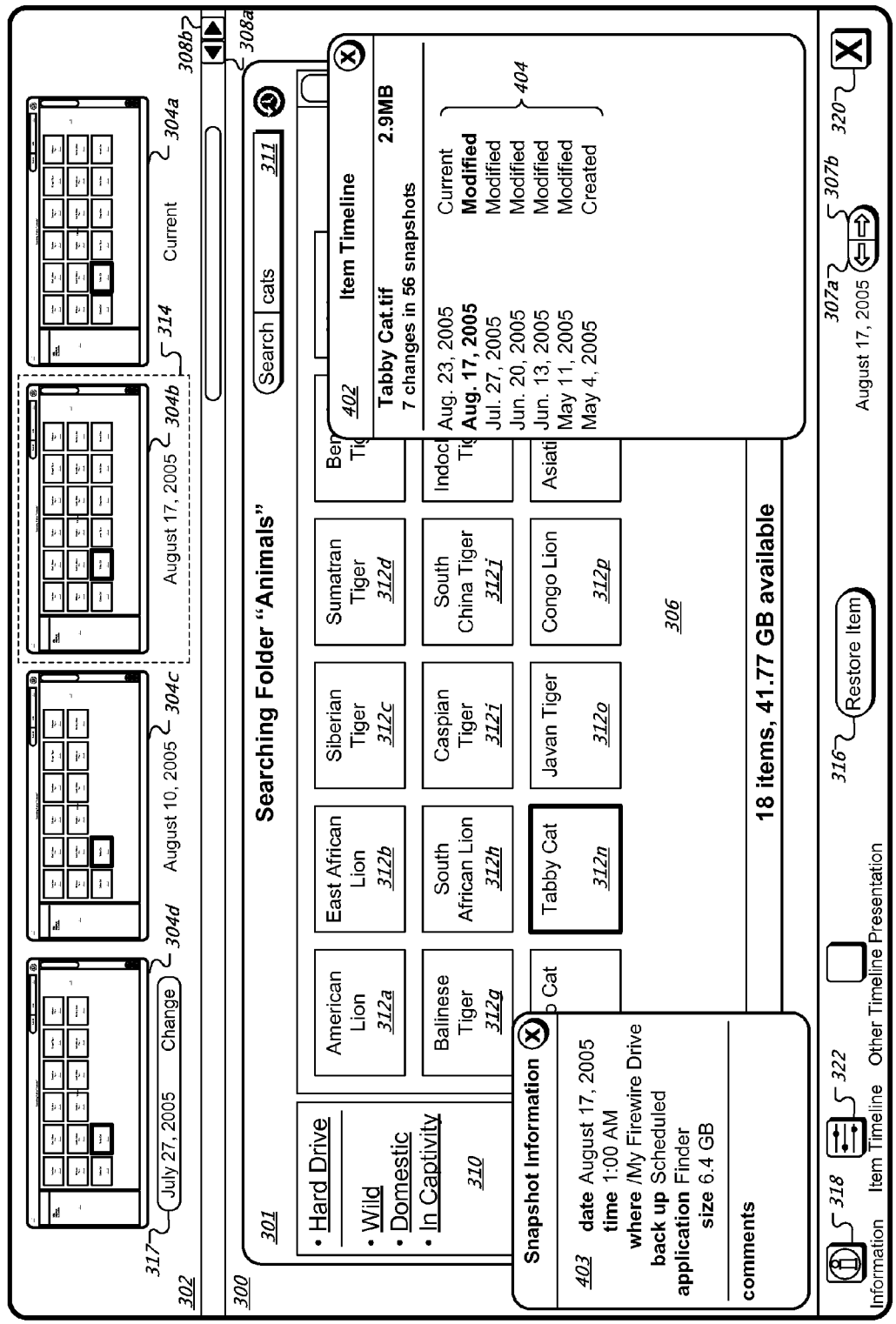
FIG. 4 is a screen shot depicting an example of a time machine user interface including an item timeline associated with a file within the search results from the search application.

FIG. 4 is a screen shot depicting an example of the time machine user interface 300 including an item timeline 402 and snapshot information 403 associated with search results in the search application 301. The snapshot information 403 includes the date and time that the snapshot 304b was taken, the location of the snapshot 304b, the method used to take the snapshot 304b (e.g., manually requested or scheduled automatically), the application used to take the snapshot 304b, the size of the snapshot 304b, and comments associated with the snapshot 304b. In other implementations, the information 403 can present different characteristics of the snapshot.

The item timeline 402 indicates that, for the selected Tabby Cat item 312n, there are 7 different sets of results in the 56 available snapshots. That is, in this implementation, there is a total of 56 snapshots available that correspond to system states or contents at different times, and 7 of these have been identified in the search.

The item timeline 402 presents a list 404 of the resulting snapshots. The list 404 includes the date of the snapshot as well as an indication of the type of change that was made, such as creation or modification. The item timeline 402 allows a user to see when the responsive contents were captured and what type of change was made for each time or date. For example, the list 404 shows that the current version of this item 312n is dated Aug. 23, 2005, and that the currently selected version (in bold) is from Aug. 17, 2005. The next entry in the timeline is the Jul. 27, 2005 version, wherein the corresponding snapshot 304d is also marked with the highlighting 317. In contrast, the snapshot 304c does not include a changed version of this item compared to the currently selected one, and is therefore neither listed in the item timeline 402 nor marked with the highlighting 317. In other implementations, different information can be presented, such as a number of changes made.

A user can select a snapshot in the list 404 to navigate to that snapshot. The search application 301 then presents, in the search results area 306, a result of the search performed on the corresponding contents. In certain implementations, the item timeline 402 is transparent or semi-transparent allowing windows, applications, or the time machine interface 300 to be at least partly visible through the item timeline 402.

In this implementation, the timeline 402 shows only those of the snapshot search results that are different from the current version. That is, the timeline 402 shows all snapshots that match the search, except those whose corresponding earlier state is identical to the current state. In other implementations, the timeline 402 can show all backed up versions of the item.

Figure 5:
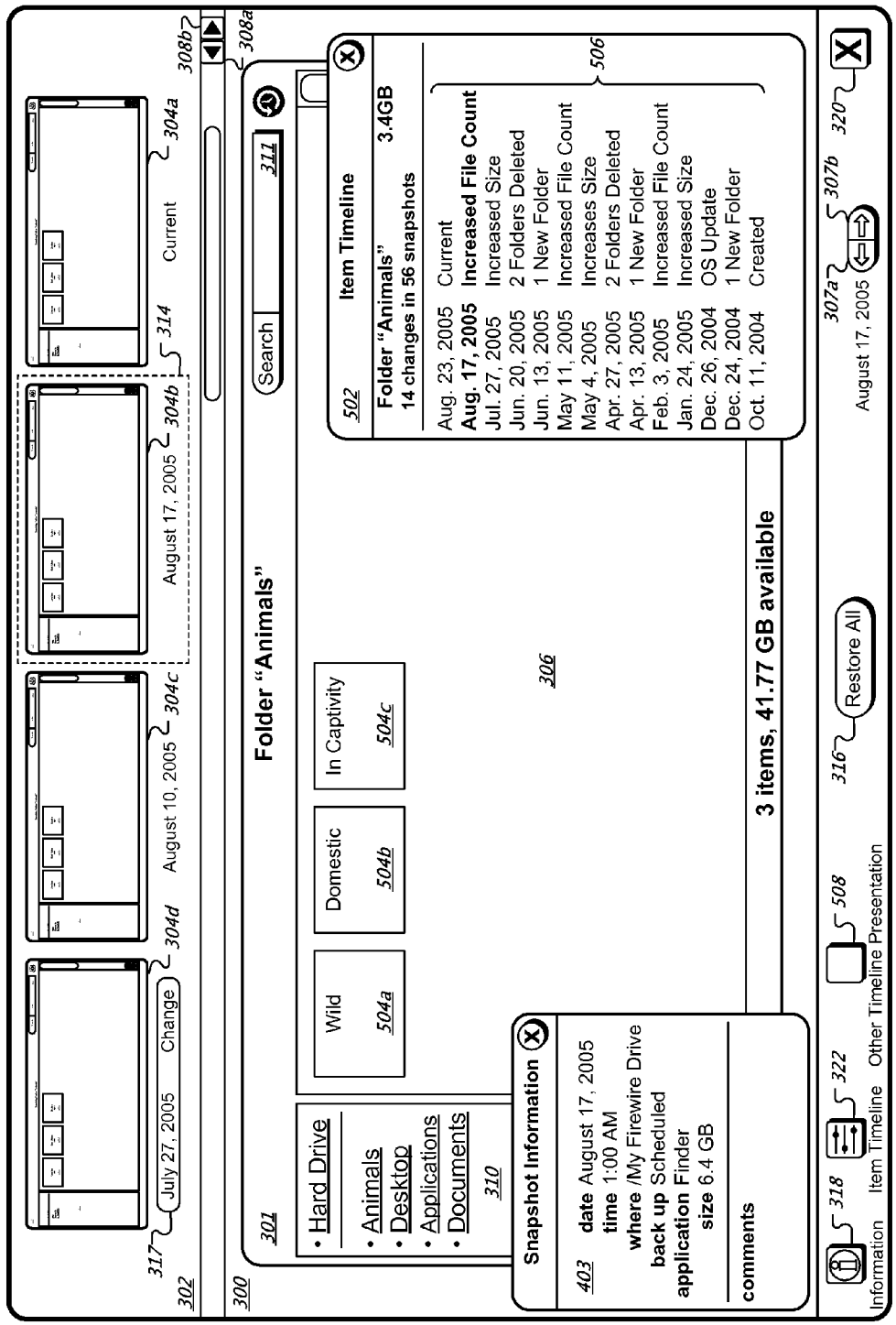
FIG. 5 is a screen shot depicting an example of a time machine user interface including an item timeline associated with a folder within the search results from the search application.

A user can modify the search conditions in the search application 301 to obtain a different set of results in the search results area 306. In an example that will now be described, the user can remove the search phrase "cats" from the search phrase control 311 to see a list of all items for the "Animals" folder. FIG. 5 is a screen shot depicting an example of the time machine user interface 300 including an item timeline 502 associated with a folder within the search application 301. The search application 301 has performed a search on the "Animals" folder with no search phrase. The results of the search include three folders 504a-c immediately within the "Animals" folder. A user can select one of the folders 504a-c to view its contents or to make it the active selection in the item timeline 502. Here, no items are selected in the search results area 306. Therefore, the item timeline 502 shows a list 506 of earlier versions of the parent "Animals" folder. Here, the listed versions are those that have some difference compared to the currently selected snapshot (i.e., they represent "changes" from it). The item timeline 502 also indicates that there are 14 snapshots having changes within the "Animals" folder and that the total number of snapshots is 56.

The time machine user interface 300 also includes a control 508 for selecting another timeline presentation. The control 508 allows a user to select for presentation a different representation of a snapshot timeline than the timeline 302 shown here. The user can choose from a snapshot calendar timeline, a snapshot stack timeline, a snapshot book timeline, or a snapshot animation timeline, to name a few examples. In certain implementations, the control 508 can provide a menu for selecting between available presentation modes/formats.

In an alternative implementation, only particular users are allowed to change presentation modes. For example, an administrative user may select a presentation mode for all user accounts on the system, which individual users cannot change. Alternatively, user accounts can include individual/group permissions allowing particular users to modify the presentation mode. In another implementation, the presentation mode is fixed (e.g., control 508 is not present). Examples of the calendar, stack, book, and animation timelines will now be described with respect to FIGS. 6, 7, 8, and 9-12, respectively.

Figure 6:
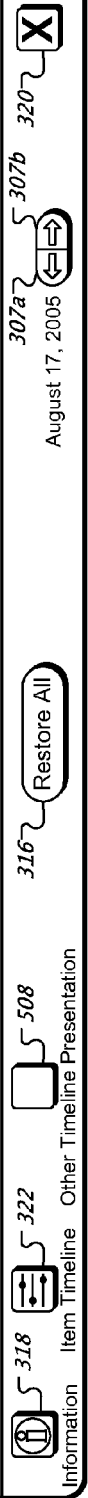
FIG. 6 is a screen shot depicting an example of a snapshot calendar timeline.

FIG. 6 is a screen shot depicting an example of a snapshot calendar timeline 600. The snapshot calendar timeline 600 shown here shows snapshots for a particular month. In other implementations, other time periods, such as weekly, bi-monthly, or quarterly, can be used. In addition, a combination of time periods can be used to present snapshot timeline information, such as dynamically changing the time interval as a user moves through time based on the frequency of the snapshots.

Days for which a snapshot was taken are provided with a snapshot image or thumbnail in the calendar timeline 600. Here, snapshots 602a-c were taken on a weekly basis on Wednesday of each week during the month of August. Snapshot 604 represents the current state of the system. A user can select one of the snapshots to make it the active snapshot in, for example, the search application 301. As shown, the snapshot 602c is currently the active snapshot in the application 301, as indicated by bold line 606. A user can select the controls 307a-b to navigate forward and backward through the snapshots.

Figure 7:
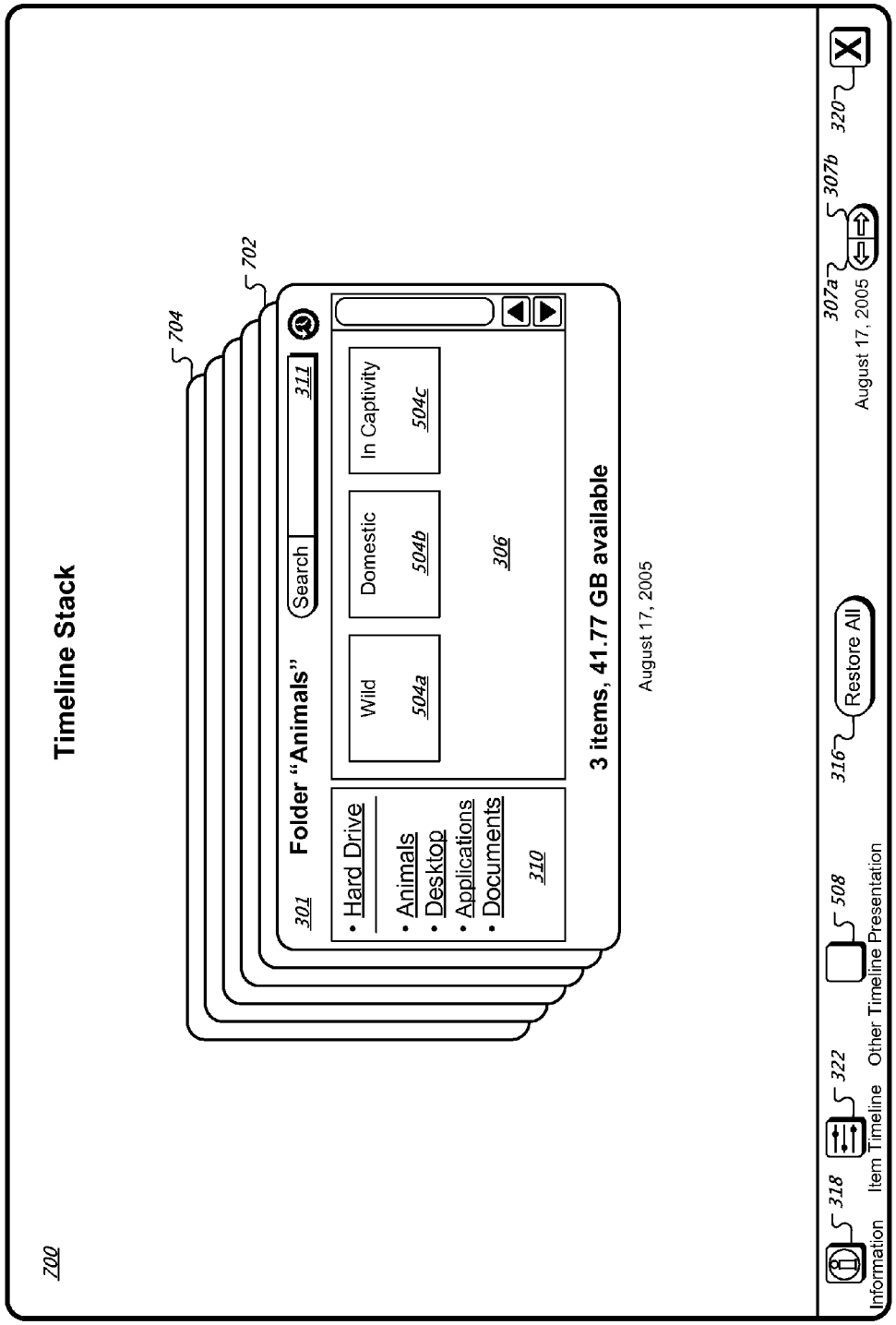
FIG. 7 is a screen shot depicting an example of a snapshot stack timeline.

FIG. 7 is a screen shot depicting an example of a snapshot stack timeline 700. In certain implementations, the stack 700 is configured to operate analogously to a deck of cards. The top card shows the results of the search in the search application 301 for the selected snapshot. The date, Aug. 17, 2005, of the selected snapshot is shown below the search application 301.

A user can move forward or backward through the stack 700 using the controls 307a-b. For example, if a user selects the control 307a a previous snapshot 702 can be selected and brought to the top of the stack 700. If, on the other hand, a user selects the control 307b a next snapshot 704 on the bottom of the stack 700 can be selected and brought to the top. Alternatively, a user can select the snapshot 702 (or the snapshot 704) directly using a pointing device.

In certain implementations, the movement of the snapshots can be animated. For example, the movement of the next snapshot 704 from the bottom of the stack 700 to the top can be shown. In addition, a top snapshot can be shown moving to the bottom, revealing the previous snapshot 702.

Figure 8:
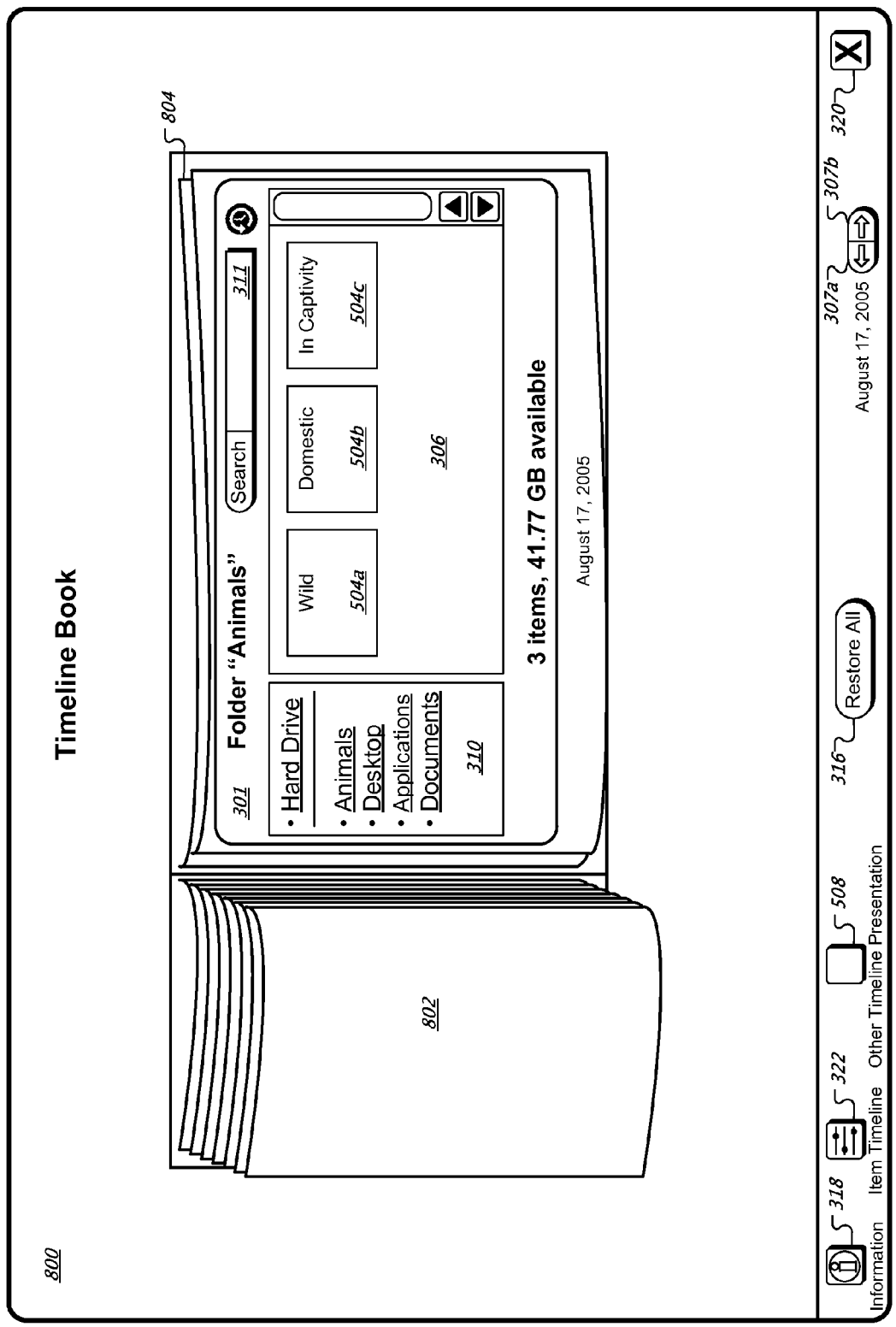
FIG. 8 is a screen shot depicting an example of a snapshot book timeline.

FIG. 8 is a screen shot depicting an example of a snapshot book timeline 800. In certain implementations, the book 800 can function analogously to a hard copy book having paper pages. The page on the right shows the results of the search in the search application 301 for the selected snapshot. The date, Aug. 17, 2005, of the selected snapshot is shown below the search application 301.

A user can move forward or backward through the book timeline 800 using the controls 307a-b. For example, if a user selects the control 307a, a previous snapshot 802 can be selected and be made visible on the right side of the book 800 and if a user selects the control 307b, the current page can be moved onto the snapshot 802, revealing a next snapshot 804 at the end of the book 800 can. Alternatively, a user can select the snapshot 802 (or the snapshot 804) directly using a pointing device.

In certain implementations, the movement of the snapshots can be animated. For example, the movement of the current page to the left side of the book 800 can be shown, revealing the next snapshot 804. In addition, a page on the left side of the book 800 can be shown turning to the right side of the book 800, revealing the previous snapshot 802.

In other implementations, the snapshots can be presented in other formats. For example, the snapshots can be presented in a format similar to a rolodex. When the user navigates to prior snapshots in the stack of snapshots it appears as if the snapshots "cards" have been flipped forward like a rolodex. Animations can be included to show this flipping motion of snapshots. In another implementation, snapshots can be presented in a circular wheel or spiral array. The snapshots can spiral into a vanishing point in the distance, becoming smaller with perceived depth. The user can navigate down the spiral to view particular snapshots. Animation can be generated to show movement down the spiral.

Figure 9:
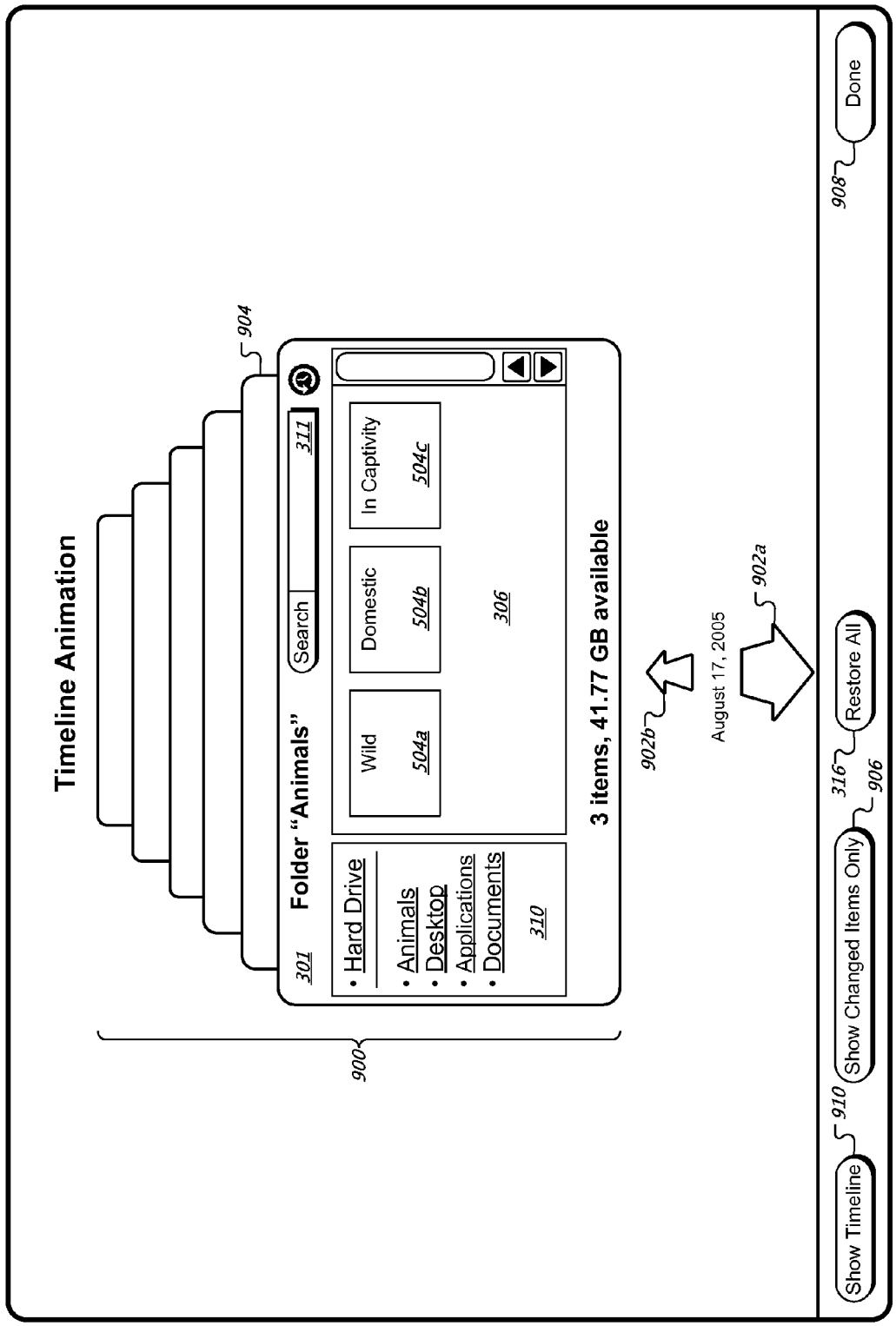
FIGS. 9-12 are screen shots depicting an example of a snapshot animation timeline.

FIGS. 9-12 are screen shots depicting an example of a snapshot animation timeline 900. Referring to FIG. 9, initially the timeline 900 contains snapshots arranged vertically toward a vanishing point near the top center of the animation screen. This gives the viewer the impression that the timeline 900 is three-dimensional and extends into the rear of the display. In certain implementations, the animation screen includes a background such as a star field, where the vanishing point is a swirling cloud of interstellar gas and dust.

A user can move forward or backward through the snapshots in the animation timeline 900 using controls 902a-b. For example, if a user selects the control 902a a previous snapshot 904 can be selected and brought to the front of the animation timeline 900. If on the other hand, a user selects the control 902b a next snapshot, if present, (not shown) can be selected and brought to the front of the animation timeline 900. Alternatively, a user can select the snapshot 902 directly with a pointing device.

A show changed items only control 906 can allow a user to select whether or not snapshots having no changed items will be presented. The presence or absence of changes can be determined relative to a currently selected snapshot or a current snapshot. Alternatively, snapshot changes are determine relative to adjacent snapshots. A done control 908 allows a user to select when the animation timeline 900 will exit and return, for example, to the previously executed application.

A show timeline control 910 allows a user to initiate an animation that transitions from the frontal perspective shown here to a side perspective timeline view. That is, the timeline will appear to perform a rotation in three-dimensional space to let the viewer see it from the side rather than from the front. Here, the vanishing point will move to the left side of the animation screen and the windows representing the snapshots will become "milestone markers" on a timeline. As the timeline 900 rotates to the side view, the snapshot thumbnail icons gradually shrink to become the milestone marker symbols. In certain implementations, a user can navigate backward and forward through the snapshots as the animation is proceeding. Alternatively, the animation can pause during navigation through the snapshots.

Figure 10:
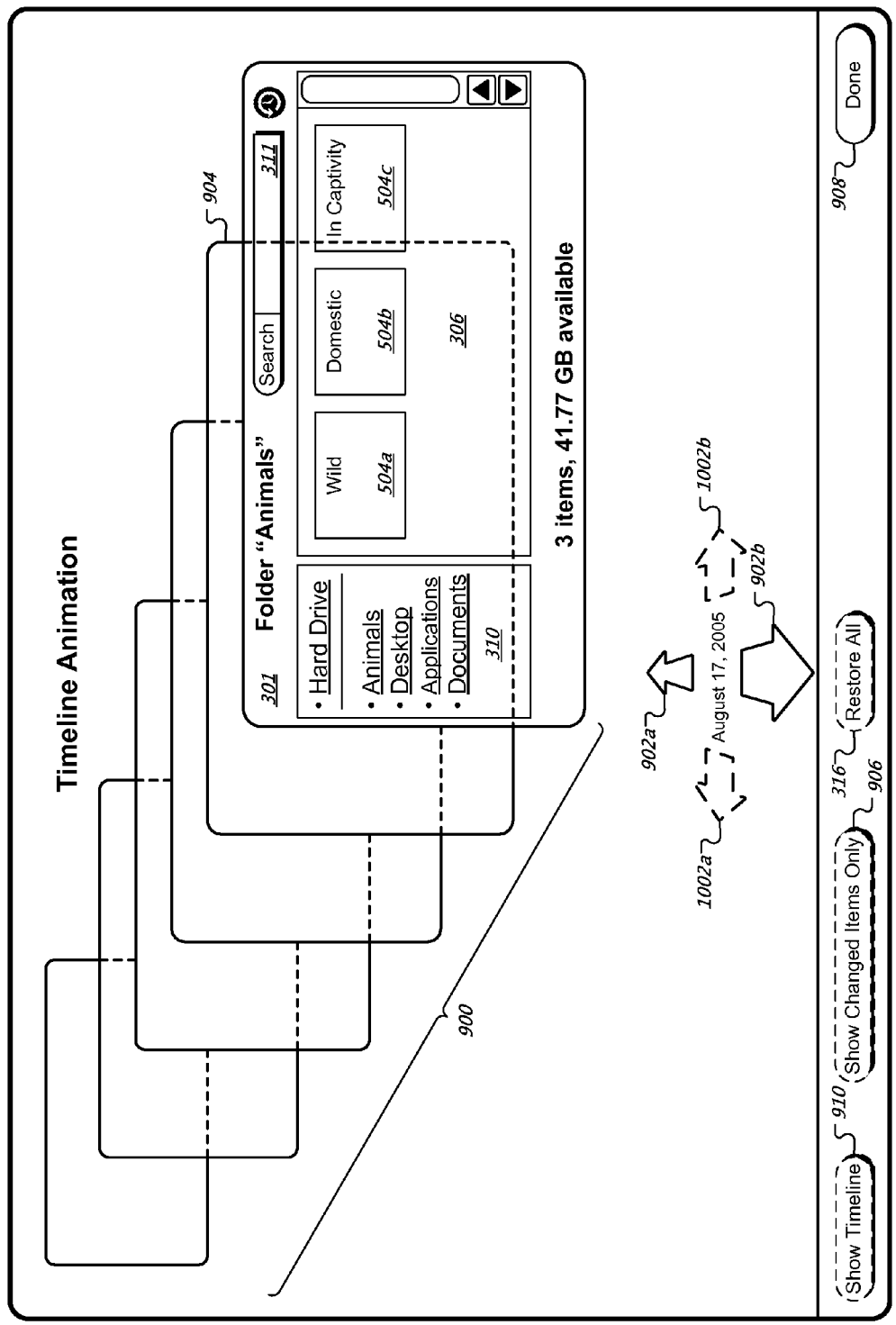

FIG. 10 shows the animation of the timeline 900 at a point in the animation after the vanishing point of the snapshots has moved to the upper left corner of the animation screen, and thus providing a rotation of the stack. In one implementation, the snapshots can be rendered partially transparent (as shown in FIG. 10) allowing a user to see some contents of a snapshot through the snapshot in front of it.

In one implementation, as the animation progresses, some controls can be animated to gradually disappear, such as the show timeline control 910, the show changed items only control 906, and the restore control 316. Other controls can gradually materialize, such as navigation controls 1002a-b. These changes can be performed in coordination with the animation of the timeline. In certain implementations, a control is selectable by a user when it is fully materialized. When the navigation controls 1002a-b materialize they allow a user to navigate to the left and to the right in the timeline 900, respectively.

Figure 11:
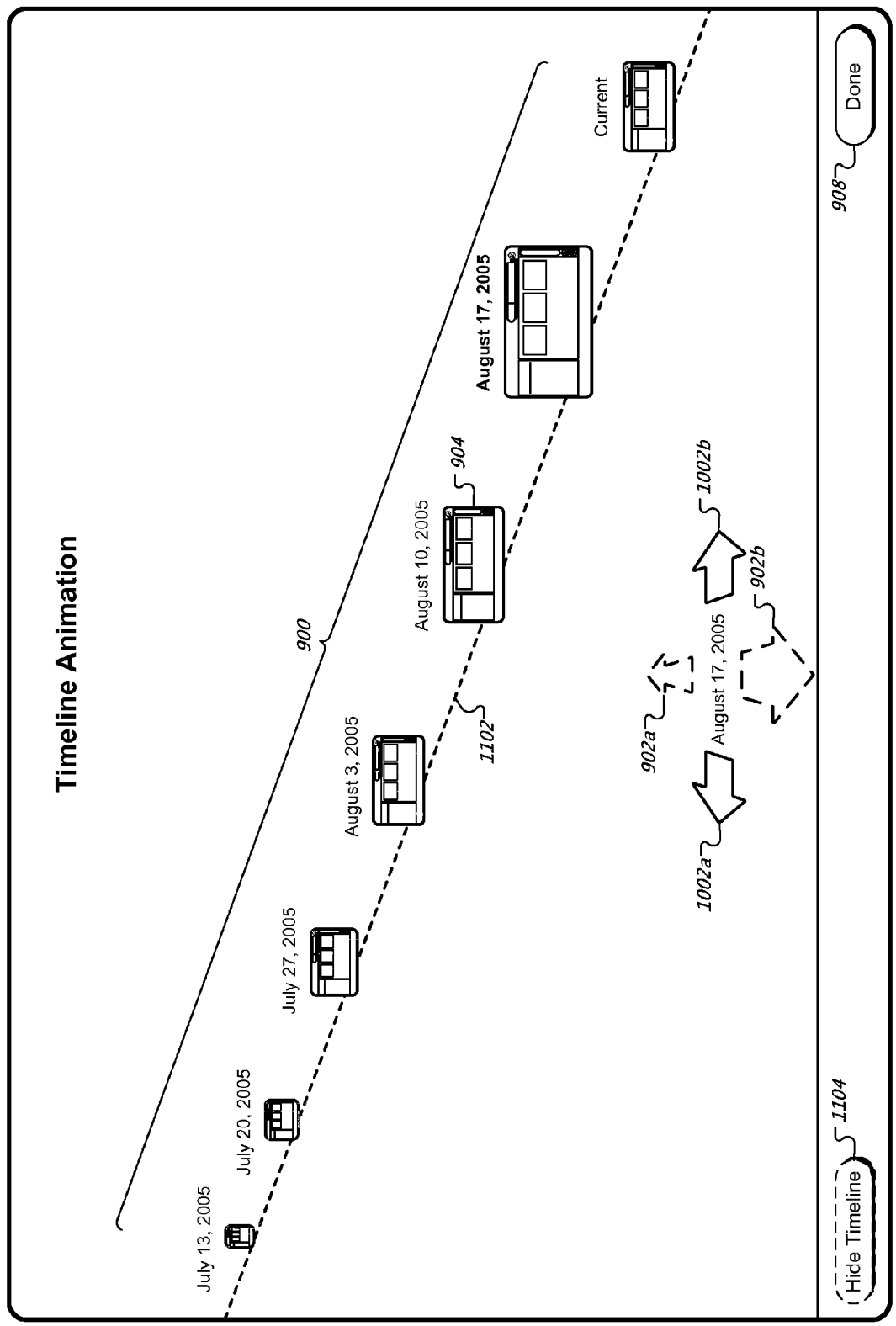

FIG. 11 shows the continued animation of the timeline 900 after the vanishing point of the snapshots has moved about half way to the middle of the left side of the animation screen. The show timeline control 910, the show changed items only control 906, and the restore control 316 are no longer displayed. The horizontal navigation controls 1002a-b have completely materialized, while the vertical navigation controls 902a-b have begun to dissolve. In one implementation, a line 1102 emphasizing the timeline 900 begins to materialize, while the snapshots have begun to decrease in size as the perspective is moved to a side view of the timeline 900. Additionally, in one implementation, dates associated with each displayed snapshot are also presented. A hide timeline control 1104 has begun to materialize. A user can select the hide timeline control 1104 to hide the timeline 900 and the line 1102. In an alternative implementation, the hide timeline control 1104 returns the user to the stack view shown in FIG. 9 above.

Figure 12:
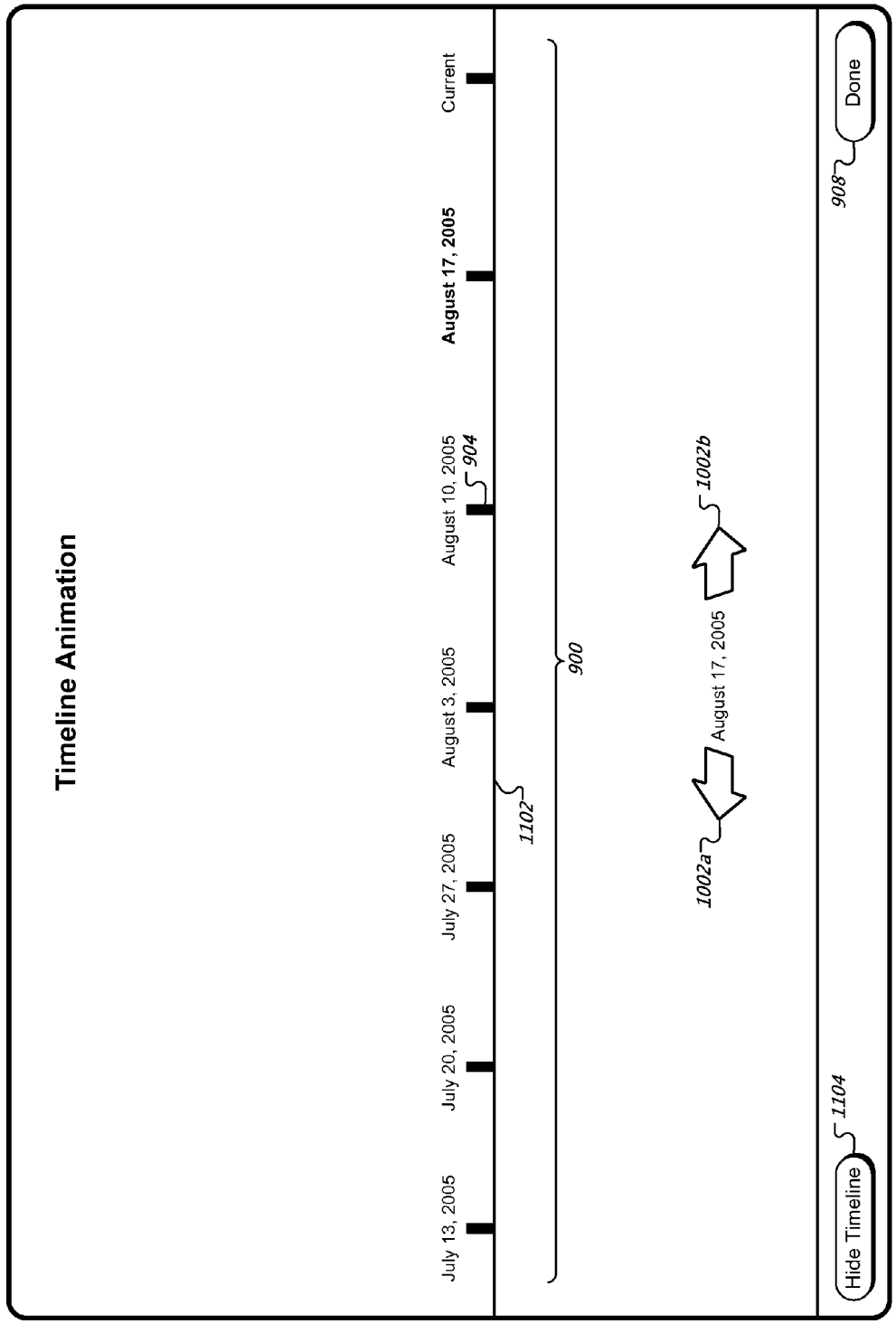

FIG. 12 shows the animation of the timeline 900 after the vanishing point of the snapshots has moved to the middle of the left side of the animation screen. The perspective of the timeline 900 is now that of a side view. The vertical navigation controls 902a-b have completely dissolved, while the line 1102 and the hide timeline control 1104 have completely materialized. Each snapshot is now represented by a milestone mark and a date on the line 1102, instead of the snapshot images. A user can select a milestone marker or use the navigation controls 1002a-b to move backward or forward through the snapshots, respectively. In one implementation, a user can select a particular milestone mark and be presented with the snapshot image corresponding to that milestone mark. In another implementation, the user can zoom in/out of the timeline, or a portion of the timeline, in order to view milestone marks at a greater level of granularity. In one implementation, the user interface provides one or more zoom controls allowing the user to manipulate the scale of all or a portion of the timeline.

The timeline 900 or the other timelines 302, 600, 700, and 800 can employ additional animations. For example, as an item is restored, an animation of the item returning to the current system state can be performed. In another example, where several items are restored, a generic animation can be played, such as a cloud of particles moving from the time machine interface 300 or the timelines 600, 700, 800, and 900 to the current system state. In addition, the time machine interface 300 or the timelines 600, 700, 800, and 900 can employ an animation during an exiting or loading procedure, such as a desktop user interface of the current system state gradually blending into the time machine interface 300 or vice versa. In certain implementations, the animation management engine 234 performs the animation actions described above.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer program product tangibly embodied in a computer readable storage medium, the computer program product including instructions that, when executed, generate on a display device a user interface, the user interface comprising:
   a first representation of a window in a current state, the first representation including a plurality of user selectable elements corresponding to data files that are currently stored in a storage repository, where the first representation of the window is selectably presented within the user interface; and
   one or more second representations of the window as it existed at times in the past, wherein each second representation of the window shows a past state of the window, wherein the one or more second representations of the window each include a plurality of user selectable elements corresponding to data files that were stored in the storage repository at a particular time in the past, and wherein the one or more second representations of the window are selectably presented within the user interface.

2. The computer program product of claim 1, where the user interface further includes an input control for initiating a restoration of the window to a state associated with one of the second representations.

3. The computer program product of claim 2, wherein initiation of the input control after the selection of a first presented element initiates the restoration of the window according to only the selected first presented element.

4. The computer program product of claim 1, where the user interface further includes a user-activated information area that presents information about a selected past state.

5. The computer program product of claim 4, where the information area provides data associated with the selected past state including when the past state was created.

6. The computer program product of claim 4, where the information area provides data associated with the selected past state including a location of the data of the past state.

7. The computer program product of claim 1, where the first representation of the window is included in a timeline, the timeline further including the one or more second representations of the window.

8. The computer program product of claim 7, where the user interface includes one or more navigation tools for navigating between the first and the one or more second representations of the window in the timeline.

9. The computer program product of claim 8, where the navigation tools include one or more scroll bars for scrolling through the representations of the past states, including scrolling to additional second representations of the window not initially shown.

10. The computer program product of claim 8, where the navigation tools include one or more arrow buttons for scrolling to additional representations of past states not initially shown.

11. The computer program product of claim 7, where the past states in the timeline are presented with a corresponding date range associated with each past state.

12. The computer program product of claim 11, where the date range is a single date.

13. The computer program product of claim 7, wherein the user interface further includes another input control for modifying the time line to include only at least one of the second representations of the window whose corresponding past state differs from the first representation of the window.

14. The computer program product of claim 1, where the first representation of the window and the one or more second representation of the window are presented as a stack.

15. The computer program product of claim 14, where the user interface includes one or more navigation tools for navigating the stack of representations.

16. The computer program product of claim 15, where the user interface animates the navigation between representations in the stack of representations.

17. The computer program product of claim 1, where the user interface displays the first and the one or more second representations as a calendar, the calendar showing the representations with respect to the corresponding date in which the past state was generated.

18. The computer program product of claim 1, where the user interface is configured to receive a user input to display the representations in a different format.

19. The computer program product of claim 18, where displaying the representations in a different format includes providing a menu for user selection of a particular format.

20. The computer program product of claim 1, where the user interface further includes a preview area that presents at least a first element of the past state.

21. The computer program product of claim 20, where the preview area presents a representation of the first element without invoking an application associated with the first element.

22. The computer program product of claim 1, where the user interface further includes a user-activated item timeline area that presents information about the past states.

23. The computer program product of claim 22, where the presented information includes information associated with changes to the first element in one or more of the past states.

24. The computer program product of claim 23, where the information associated with changes to the first element identifies each past state where a change occurred and the type of change that occurred.

25. The computer program product of claim 1, further comprising:
animating the prior state of the current view during display of the representations of the past states.

26. A system comprising:
one or more computing devices including a processor and a memory, the one or more computing devices being configured to interact in order to present a backup user interface on a display device, the backup user interface comprising:
a first representation of a window in a current state, the first representation including a plurality of user selectable elements corresponding to data files that are currently stored in a storage repository, where the first representation of the window is selectably presented within the backup user interface; and
one or more second representations of the window as it existed at times in the past, where each second representation of the window shows a past state of the window and includes a plurality of user selectable elements corresponding to data files that were stored in the storage repository at a particular time in the past, where the one or more second representations of the window are selectably presented within the backup user interface.

27. A method comprising:
displaying, in a view display area of a backup user interface, a first representation of a window in a current state, the first representation including a plurality of user selectable elements corresponding to data files that are currently stored in a storage repository;
receiving, while the first representation of the window in the current state is displayed, a first user input to display one or more second representations of the window each representing a prior state of the window as it existed at times in the past;
displaying the one or more second representations of the window, where each of the one or more second representations of the window includes a plurality of user selectable elements corresponding to data files that were stored in the storage repository at a particular time in the past;
receiving, while the one or more second representations of the window are displayed, a second user input selecting one of the user-selectable elements from one of the one or more second representations of the window for restoration to the window in the current state; and
modifying, in response to the second user input, the window in the current state at least with regard to the first element.

28. A method comprising:
receiving, while a window in a current state is displayed in a user interface, a first user input to display one or more snapshot representations of the window representing respective prior states of the window as it existed at times in the past, wherein the window in the current state includes a plurality of user selectable elements corresponding to data files that are currently stored in a storage repository; and
displaying the one or more snapshot representations of the window in a backup user interface distinct from the window, where a first snapshot representation of the window includes a plurality of user selectable elements corresponding to data files that were stored in the storage repository at a particular time in the past, and where each of the one or more snapshot representations correspond to a portion of a respective backup archive associated with the storage repository.

29. The method of claim 28, further comprising:
receiving, while the first snapshot representation of the window is displayed, a second user input requesting that the first element be restored to the window in the current state; and
modifying, in response to the second user input, the window at least with regard to the first element.

30. The method of claim 28, where the window is a search application interface window displaying two or more elements responsive to a search and each snapshot representation of the window is a visual representation of the search application interface window displaying two or more elements corresponding to versions of items at times in the past responsive to the search.

* * * * *